United States Patent
Jiang

(10) Patent No.: US 8,170,140 B2
(45) Date of Patent: May 1, 2012

(54) MODIFIED ACTIVE-SET APPROACH FOR PEAK-TO-AVERAGE POWER RATIO REDUCTION VIA RESERVATION TONE

(75) Inventor: Sen Jiang, Beijing (CN)

(73) Assignee: STMicroelectronics R&D Co. Ltd. (Beijing), Beijing (CN)

( * ) Notice: Subject to any disclaimer, the term of this patent is extended or adjusted under 35 U.S.C. 154(b) by 1134 days.

(21) Appl. No.: 12/018,825

(22) Filed: Jan. 24, 2008

(65) Prior Publication Data

US 2008/0181333 A1 Jul. 31, 2008

(30) Foreign Application Priority Data

Jan. 30, 2007 (CN) .......................... 2007 1 0007921

(51) Int. Cl.
*H04L 27/28* (2006.01)
(52) U.S. Cl. ......................... 375/296; 375/260
(58) Field of Classification Search .................. 375/295, 375/296, 259, 260
See application file for complete search history.

(56) References Cited

U.S. PATENT DOCUMENTS

| 7,627,046 B1* | 12/2009 | Dick et al. ..................... 375/260 |
| 2005/0100108 A1* | 5/2005 | Yun et al. ..................... 375/260 |

OTHER PUBLICATIONS

Krongold et al., An Active-Set Approach for OFDM PAR Reduction via Tone Reservation, IEEE Transactions on Signal Processing, vol. 52, No. 2, Feb. 2004, pp. 495-509.*
Krongold, Brian S., An Active-Set Approach for OFDM PAR Reduction via Tone Reservation, IEEE Transactions on Signal Processing, vol. 52, No. 2, Feb. 2004, pp. 495-509.
Krongold, Brian Scott, New Techniques for Multicarrier Communication Systems, University of Illinois at Urbana-Champaign, Urbana, Illinois, 2001, pp. i-xi, 1-168.

* cited by examiner

*Primary Examiner* — Kevin M Burd
(74) *Attorney, Agent, or Firm* — Hogan Lovells US LLP

(57) ABSTRACT

An active-set PAR reduction method has low computation cost and delay. Peak canceling, by adding up the original signal and the peak canceling signal, is done only after the final peak canceling signal that can reduce all peaks of the resultant signal below the desired peak level is generated with an iterative method or a maximum iteration is reached. The PAR reduction method cancels the high computation cost for accumulating the peak-canceling effort into each sample every iteration. In the i-th iteration, the method attempts to resolve an intermediate peak canceling signal that can reduce the i peaks of the resultant signal to the desired peak level. The method only calculates the samples of the intermediate peak canceling signal and performs balance testing in some locations where the peak level of the original signal is larger than a selected threshold.

7 Claims, 3 Drawing Sheets

MODIFIED ACTIVE-SET APPROACH FOR PEAK-TO-AVERAGE POWER RATIO REDUCTION VIA RESERVATION TONE

RELATED APPLICATION

The present application claims priority of Chinese Application No. 200710007921.0 filed Jan. 30, 2007, which is incorporated herein in its entirety by this reference.

TECHNICAL FIELD

The present invention is related to Peak-to-Average power ratio (PAR) reduction in multicarrier communication systems.

BACKGROUND OF THE INVENTION

Multicarrier transmission has been widely adopted recently in wireline and wireless communication systems such as asymmetric digital subscriber line (ADSL) system, digital video broadcast (DVB), wireless local/metropolitan area networks (WLAN/WMAN). Exploiting discrete multitone modulation (DMT) or orthogonal frequency division multiplexing (OFDM), these systems achieve greater immunity to multipath fading and impulse noise with lower cost. However they also suffer from a high peak-to-average power ratio (PAR) problem. Without additional appropriate processing, the high PAR of a transmit signal causes a high power amplifier (HPA) to operate in its nonlinear region, which leads to spectral growth, out-of-band radiation and performance degradation.

Mathematically, the PAR for a given L times oversampled OFDM block of digital samples x can be written as:

$$PAR = \frac{\max_{0 \leq k \leq NL-1} |x[k/L]|^2}{E\{|x[k/L]|^2\}} \quad (1)$$

where $x[k/L] = x(k \cdot T/L) + \frac{1}{N}\sum_{n=0}^{N-1} X_n \cdot e^{j2\pi kn/NL}$, $k = 0, 1, \ldots, NL-1$ $X_n$, $n=0, 1, \ldots, N-1$ is the data symbol modulated onto the nth subcarriers, $1/NT$ is the subchannel spacing. $E\{\ \}$ denotes the expected value.

Tone reservation is one of the important PAR reduction techniques. It modulates unavailable or reserved tones to produce a data-block-dependent peak canceling signal c, so that the maximum magnitude of the output signal x+c=IDFT(X+C) is below the desired peak power level and the PAR of the output signal is lower than that of x. The vectors $X=[X_0, X_1, \ldots, X_{N-1}]$ and $C=[C_0, C_1, \ldots, C_{N-1}]$ cannot both be nonzero on a given subcarrier:

$$X_k + C_k = \begin{cases} X_k, k \in U \\ C_k, k \in U^c \end{cases} \quad (2)$$

where N subcarriers in an multicarrier system are divided into two subsets: the subcarrier set U for useful data and the subcarrier set $U^c$ for symbols optimized to reduce PAR. The key problem in tone reservation is how to produce the peak canceling signal with low computation cost.

An active-set approach is a well-known and efficient way to resolve the linear optimization problem, which can be applied directly to design an optimum peak canceling signal.

In the prior art, a peak-reduction kernel $p_0$ is used as the basis of a PAR-reduction signal for the algorithm, which is computed by projecting an impulse at location n=0 onto the set of reserved tones and is scaled to have unit value at n=0. The active set method is summarized as follows:

1) Begin with $x^0=x$, Set i=1, and Let $E^0$ be the maximum magnitude. The active set contains the maximum-magnitude sample at location $n_1$.
2) Set $p^1=p_{n_1}$, $p_{n_1}$ is obtained by circularly shifting $p_0$ at $n_1$.
3) Perform peak-testing with $x^{i-1}$ and $p^i$.
4) Find the minimum step size $\mu^i$ with equation (3) and compute $E^i=E^{i-1}-\mu^i$. Add the peak associated with $\mu^i$ to the active set.

$$\mu^i = \min_{q \notin A}\left(\frac{E^{i-1} - |x_q^{i-1}|}{1 - \mathrm{sgn}(x_q^{i-1})p_q^i} \geq 0\right) \quad (3)$$

5) Compute $x^i = x^{i-1} - \mu^i p^i$
6) If a maximum number of iteration is reached, or the desired peak-power level W is reached, then STOP.
7) Set up the matrix equation (4) and solve for αs.

$$\begin{bmatrix} 1 & p_{n_1-n_2} & \cdots & p_{n_1-n_i} \\ p_{n_2-n_1} & 1 & \cdots & p_{n_2-n_i} \\ \vdots & & & \vdots \\ p_{n_i-n_1} & p_{n_i-n_1} & \cdots & 1 \end{bmatrix} \begin{bmatrix} \alpha_1 \\ \alpha_2 \\ \vdots \\ \alpha_i \end{bmatrix} = \begin{bmatrix} S_{n_1} \\ S_{n_2} \\ \vdots \\ S_{n_i} \end{bmatrix} \quad (4)$$

Where $p_n$ is the n th entry of $p_0$ and $S_{n_i}=\mathrm{sign}(x_{n_i}^{i-1})$ $$p^i = \sum_{l=1}^{i} \alpha_l p_{n_l}$$

9) Go to STEP 3.

The prior art method increases the peaks in the active set by one and calculates the whole peak canceling signal for these peaks in each iteration in order to get the optimum PAR reduction performance. But in practice, what is needed is not the maximum PAR reduction, but reducing the PAR to the desired range or reducing the maximum magnitude below the desired peak power level. In the prior art method, calculating the whole peak canceling signal and balancing the whole output signal in each iteration, which increases delay and computation cost greatly, is not necessary.

What is desired is an approach that enables comparable PAR reduction, but with less computation requirement and much less maximum delay.

SUMMARY OF THE INVENTION

According to the present invention, a modified active-set PAR reduction method has low computation cost and delay. The method of the present invention reduces the computation complexity and maximum delay compared to the prior active set approach applied in PAR reduction. However the method of the present invention also can be applied in other similar optimization problems. In the method of the present invention, peak canceling, that is to add up the original signal and the peak canceling signal, is done only after the final peak canceling signal that can reduce all peaks of the resultant signal below the desired peak level is generated with a iterative method or maximum iteration is reached. The method of the present invention cancels the high computation cost for accumulating the peak-canceling effort into each sample every iteration. In i-th iteration, the method of the present invention attempts to resolve an intermediate peak canceling signal that can reduce the i peaks of the resultant signal to the desired peak level. Differing from the prior active-set PAR reduction, the method of the present invention calculates the samples of the intermediate peak canceling signal and performs balance testing only in some locations where the peak level of the original signal is larger than a predetermined threshold. One embodiment of the method of the present invention is as follows:

Initialize the active set to only contain the location of the maximum magnitude sample of the signal to be PAR reduced. The size of the active set is one. The iteration number is set one.

Find all samples whose magnitude are above a predetermined magnitude level that is lower than the desired peak level and location are not in the active set and store their locations into the test set.

Calculate the excess values that the magnitudes of the samples whose locations are in the active set overrun the desired peak level. Use these excess values and the matrix composed by the samples of the circularly shifted kernels to resolve a balance vector by which the circularly shifted kernels are weighted to make the magnitudes of the peak cancelled samples at the locations in the active set equal to the desired peak level.

Generate the samples of the intermediate peak canceling signal at the locations in the test set with the balance vector and the samples of the circularly shifted kernels.

Calculate a minimum scalar for each location in the test set, which scales the peak canceling signal and makes the sample of the peak canceled signal at this location has the maximum magnitude of the peak canceled signal at the locations in the active set. Find the minimum value between these scalars and one as the balance scalar. Move the location associated with the minimum value from the test set to the active set.

If the maximum iteration number is reached or the balance scalar is equal to one, compute the peak canceling signal by adding up the circularly shifted kernels weighted by the negative product of the balance scalar and vector and output the sum of the peak canceling signal and the original signal, then STOP.

Otherwise, increase the iteration number by one and continue iterating the above method at the step of calculating the excess values.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF THE INVENTION

Figure 1A:
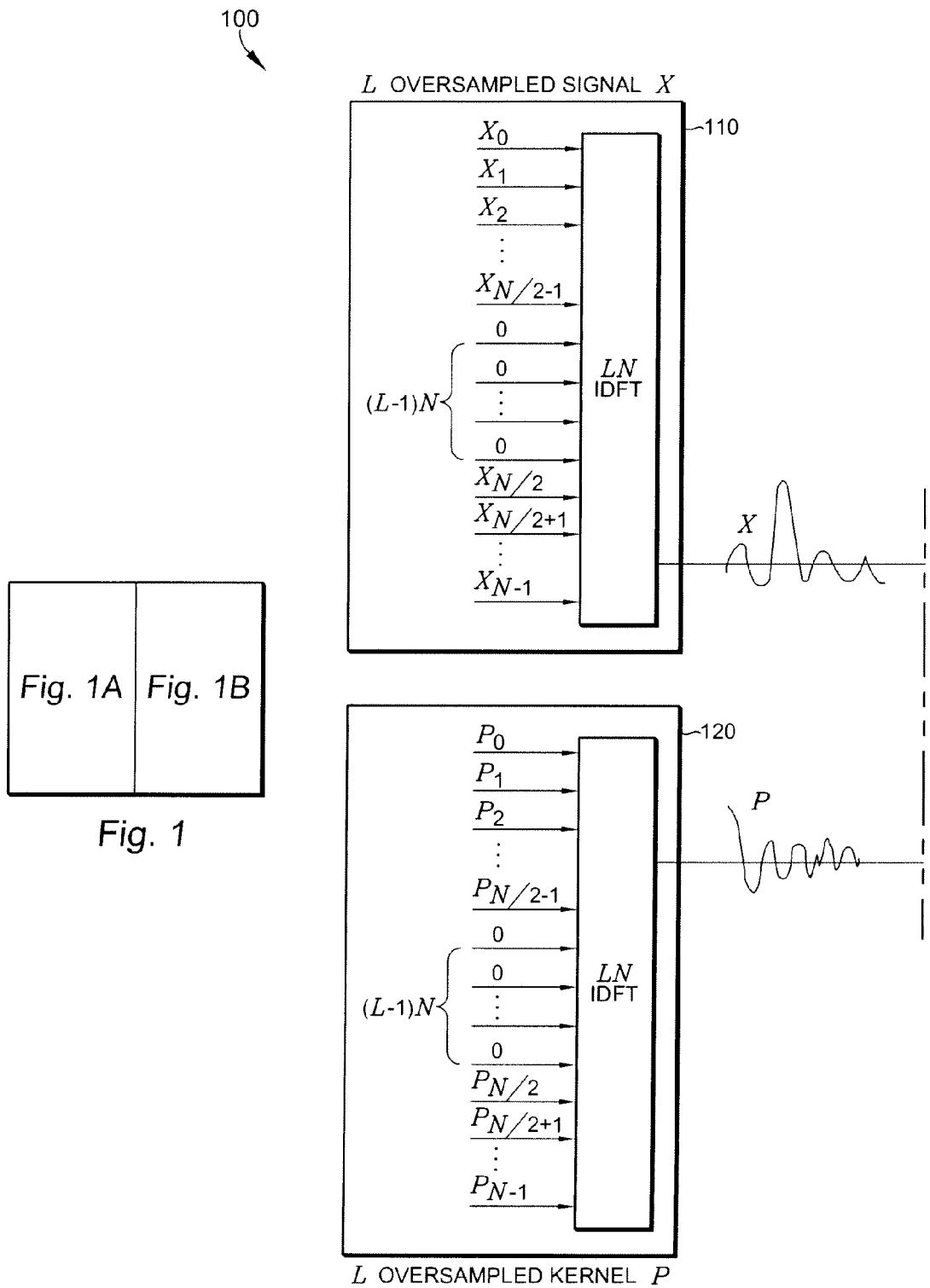
FIG. 1 is a block diagram of the computational blocks used to implement the method of the present invention.
Figure 1B:
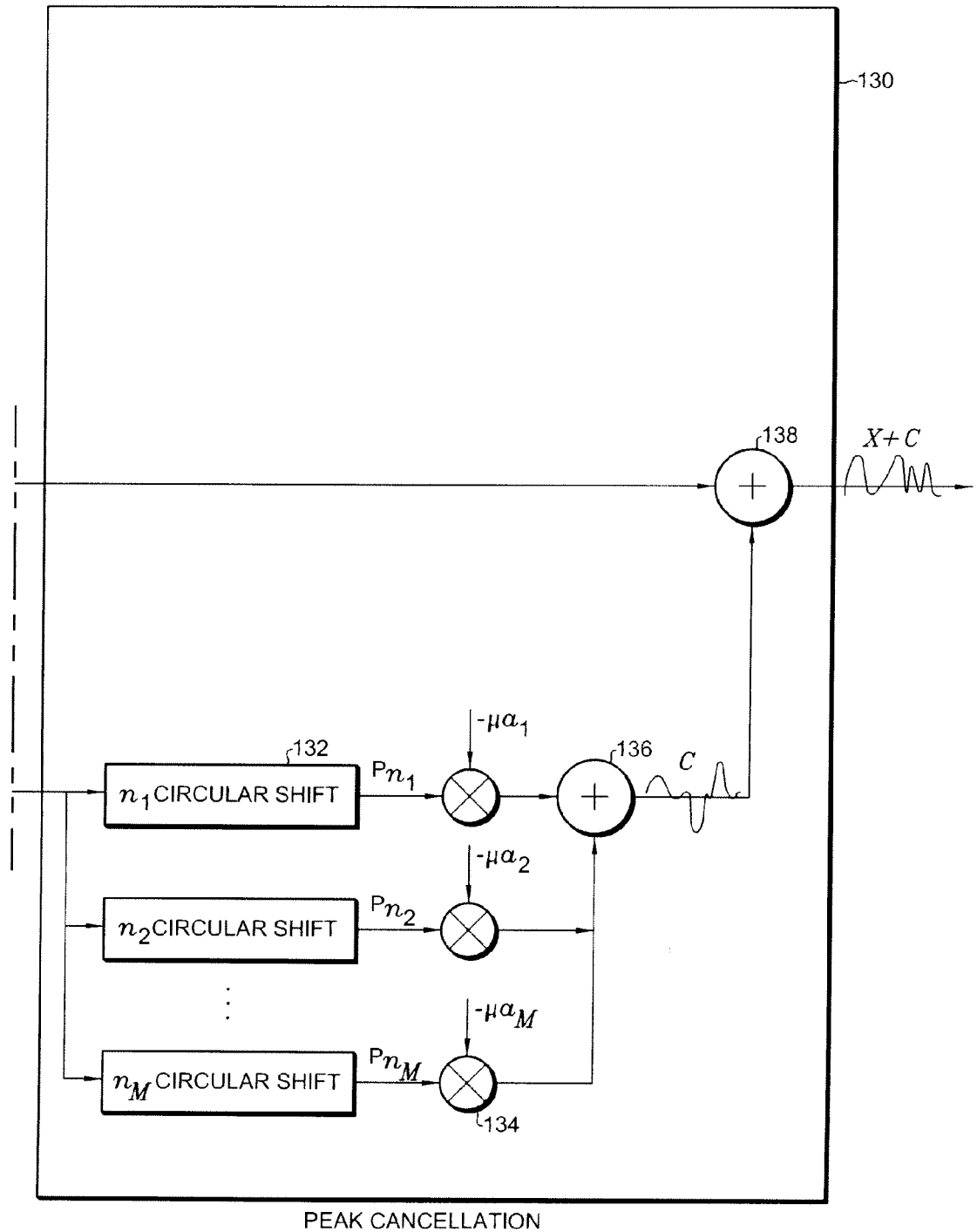

A block diagram 100 of the computational blocks used in the method of the present invention is shown in FIG. 1. An OFDM signal is the sum of N independent quadrature amplitude (QAM) modulated symbols modulated onto subchannels of equal bandwidth with frequency separation of 1/T between adjacent subcarriers, where T is the time duration of the OFDM symbol. As known in the prior art, PAR reduction over the L oversampled signal can relieve PAR regrowth that happens after the processed signal passes through a digital filter. Block 110 is an LN-point inverse discrete Fourier transform that is replaced by an inverse fast Fourier transform if LN is a power of two. Block 110 calculates L oversampled time domain original signal x for each QAM modulated symbol block $X=\{X_0, X_1, \ldots, X_{N-1}\}$. X presents a N complex-valued symbol block, which is created by mapping a part of the input bit stream into QAM symbols, $X_i$ is the (i+1)-th QAM symbol in X and modulated on to (i+1)-th subcarrier. x, L oversampled time-domain signal of X, is the signal to be peak cancelled for PAR reduction. Block 120 is an LN-point inverse discrete Fourier transform that is replaced by an inverse fast Fourier transform if LN is a power of two. Block 120 calculates L oversampled time-domain signal p, for a tone reservation $P=\{P_0, P_1, \ldots, P_{N-1}\}$. P represents a tone reservation. $P_i$ is the value modulated on the i-th subcarrier. If the (i+1)-th subcarrier is not reserved, $P_i=0$. If the (i+1)-th subcarrier is reserved, $P_i=a$, $X_i=0$. Constant a is a real constant that scales $p_0$ to have a unit value at n=0. Signal $p_0$ is called a "kernel" because the peak canceling signal is composed by several weighted and shifted versions of $p_0$. Block 120 can be performed offline and stores the kernel $p_0$ in memory if the set of reserved tones are fixed, that is, $P=\{P_0, P_1, \ldots, P_{N-1}\}$ is unchanged for all blocks X. Block 130 generates a peak-canceling time-domain signal c by weighting and accumulating M circular shifted versions of $p_0$ and reduces PAR of the resultant signal by adding x and c. Block 130 involves three kinds of operators: circular shift operators 132, multipliers 134 and summers 136 and 138. A circular shift means a permutation of the entries in a tuple where the last element becomes the first element and all the other elements are shifted backward. In block 130, $n_1, n_2, \ldots, n_M$ denote the number of circular shift operations that equal the positions of the maximum magnitude samples of the shifted kernels, μ is a balance scalar that balances the maximum magnitude of x+c at $n_1, n_2, \ldots, n_M$ with the maximum magnitude of x+c at the other locations, $[(\alpha_1, \alpha_2, \ldots, \alpha_M]$ is a balance vector that makes the M peaks positioned by $n_1, n_2, \ldots, n_M$ of x+c equal to the desired peak level assuming μ is equal to one. The negative product of the balance scalar and vector is a weight vector used to weight the M circular shifted kernels $p_{n_1}, p_{n_2}, \ldots, p_{n_M}$.

A key aspect of the present invention focuses on block 130 to find the appropriate value of M, the shift distances $n_1, n_2, \ldots, n_M$ and calculate balance scalar μ and vector$[\alpha_1, \alpha_2, \ldots, \alpha_M]$ using an iterative manner. Assuming L oversampled time-domain signal, peak canceling kernel and desired peak level are provided.

The method of the present invention is summarized by the following steps:

1) Begin with $x^0=x$, Set i=1. Let E be the maximum magnitude. Let W be the desired peak level. The active set A contains the maximum-magnitude sample at location $n_1$. M=1 is the size of A.

2) Find all of the samples except those in the active set A, whose magnitude are above the predetermined level V and put their locations into the set B.

3) Set $S_{n_l} = |x_{n_l}| - W$, $l=1, 2, \ldots, M$ and resolve the balance vector $[\alpha_1, \alpha_2, \ldots, \alpha_M]$ with equation (4).
4) Generate $$c_q^i = \sum_{l=1}^{j} \alpha_l p_{n_l}(q),$$

q∈B, $p_{n_l}(q)$ denotes the q+1-th sample of $p_{n_l}$ and $c_q^i$ denotes the q+1-th sample of the intermediate peak canceling signal in i-th iteration.

5) Find the minimum step size μ with equation (5), move the location q associated with associated with μ from B into A and M=M+1

$$\mu = \min\left\{\min_{q \in B}\left(\frac{E - |x_q|}{1 - \text{sgn}(x_q)c_q^i} \geq 0\right), 1\right\} \quad (5)$$

6) If μ=1 or the maximum number of iteration is reached, compute the peak-canceling $$c = \sum_{l=1}^{M} (-\mu \alpha_l) p_{n_l}$$

and the output signal x'=x+c, then STOP
7) i=i+1 go to STEP 3.

V is selected offline to balance the performance and complexity. All complexity reduction techniques applied in the original active set approach also can be exploited in the modified approach.

In the above description "location" means the position of one sample in the signal (LN samples). For example, for the first sample of the signal, its "location" is 0 and the "location" of the second sample is 1. The set A and B can be realized with an array. Each entry stores one "location". With these locations, the samples in the signal can be addressed.

The method of the present invention is further summarized below:

1) Initialize the active set to only contain the location of the maximum magnitude sample of the signal to be PAR reduced. The size of the active set is one. The iteration number is set to one.
2) Find all samples whose magnitude are above a predetermined magnitude level that is lower than the desired peak level and location are not in the active set and store their locations into the test set.
3) Calculate the excess values that the magnitudes of the samples whose locations are in the active set overrun the desired peak level. Use these excess values and the matrix composed by the samples of the circularly shifted kernels to resolve a balance vector by which the circularly shifted kernels are weighted to make the magnitudes of the peak cancelled samples at the locations in the active set equal to the desired peak level.
4) Generate the samples of the intermediate peak canceling signal at the locations in the test set with the balance vector and the samples of the circularly shifted kernels.
5) Calculate a minimum scalar for each location in the test set, which scales the peak canceling signal and makes the sample of the peak canceled signal at this location has the maximum magnitude of the peak canceled signal at the locations in the active set. Find the minimum value between these scalars and 1 as the balance scalar. Move the location associated with the minimum value from the test set to the active set.
6) If the maximum iteration number is reached or the balance scalar equals to 1, compute the peak canceling signal by adding up the circularly shifted kernels weighted by the negative product of the balance scalar and vector and output the sum of the peak canceling signal and the original signal, then STOP.
7) Increase the iteration number by one and go to STEP 3.

The prior solution described in the Background of the Invention calculates the whole peak canceling signal and balances the peaks in the active set with it in each iteration. Thus it accumulates the peak-canceling effort into each output sample every iteration. In fact, the final peak-canceling signal is the sum of all peak canceling signals produced in the iterations. Because in practice the sample size is very large, much computation is required to achieve the whole signals.

The method of the present invention does peak canceling only when the final peak canceling signal is found out. The method of the present invention cancels the high computation cost for accumulating the peak-canceling effort into each sample every iteration. Furthermore the method of the present invention only calculates the samples of the intermediate peak canceling signal and performs balance testing (compute μ) in some locations where the peak level of the original signal is larger than a predetermined threshold. The number of these locations can be very small by selecting an appropriate threshold. For the above reasons, the new solution reduces computation complexity greatly compared with the prior solution.

By introducing the new solution to PAR reduction, the following objectives have been achieved:

1. The comparable performance of PAR reduction is achieved.
2. The complexity is reduced.
3. The maximum delay is reduced greatly.

Figure 2:
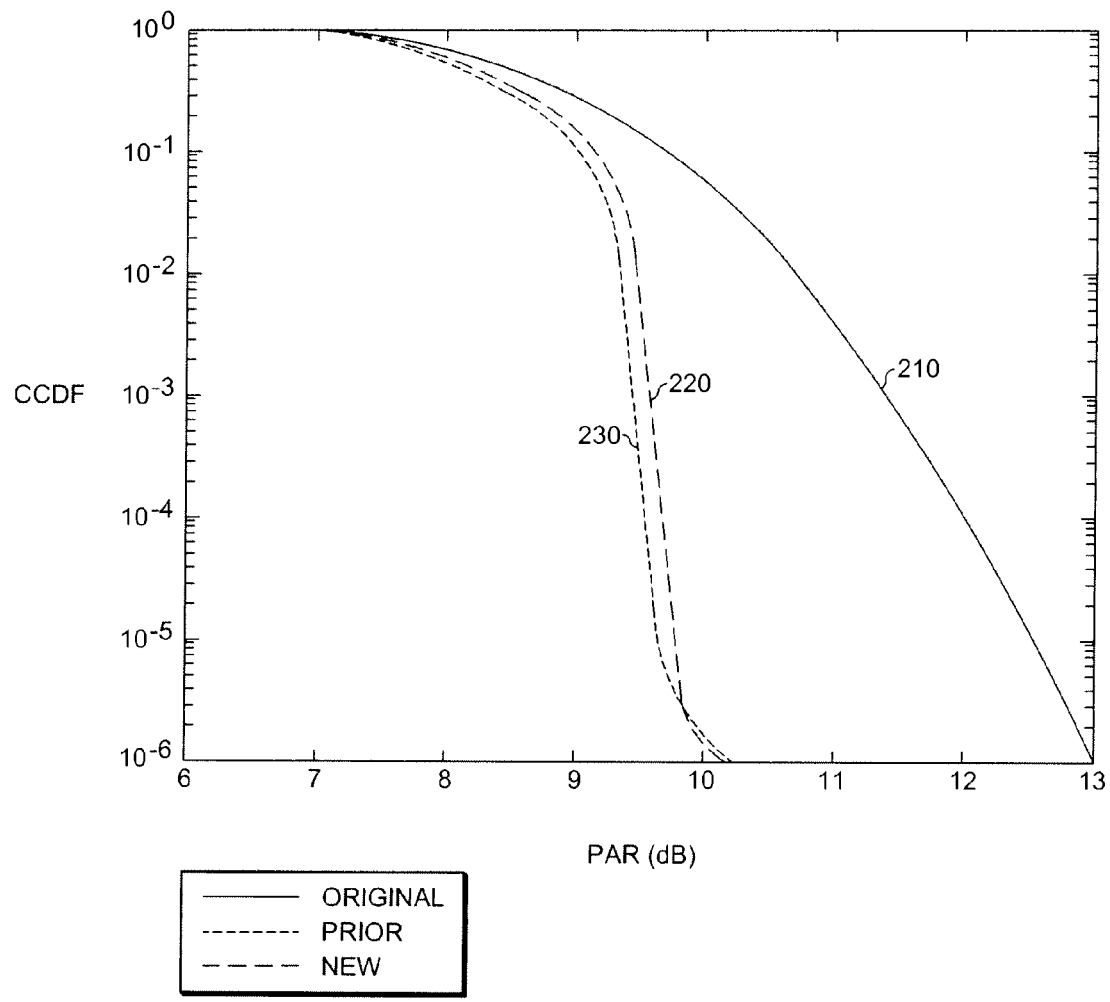
FIG. 2 is a graph of the PAR cumulative distribution functions (CCDFs) for the prior art method and the method of the present invention.

In a simulation, a length N=256 complex-baseband OFDM signal was generated with QPSK on 245 of the 256 subchannels. The remaining 11 subchannels {5, 25, 54, 102, 125, 131, 147, 200, 204, 209, 247} are for tone reservation. Octagonal approximation in equation [1] was applied and the original signal x, the kernel signal $p_0$ were L=4 oversampled before PAR reduction. The final PAR is calculated with eight oversamples, which is accurate enough to approximate the analog PAR. The maximum iteration number is four. Iterations were performed until the PAR (L=4) was below 9.5 dB. In the new solution, the predetermined level V=0.128. The PAR cumulative distribution functions (CCDFs) results of the prior solution and the new solution for up to four iterations are shown in FIG. 2. For comparison, the CCDF of the original signal 210 is also shown in FIG. 2. The CCDF of the present invention 220 is very close to the CCDF of the prior art solution 230 where PAR is above 9.5 dB. Because the method of the present invention reduces the maximum peak just below the desired peak power level, the CCDF of the method of the present invention 220 is a little higher than that of the prior art solution where PAR is below 9.5 dB, which saves the energy of the peak canceling signal inserted by the method of the present invention but doesn't affect the performance of the whole system.

Because the sample sizes of the oversampled original signal x for a OFDM block and kernel signal $p_0$ are very large, the complexity of the prior art solution (with complexity reduction method in balancing test) is dominated by iteration numbers and the computation load of STEP 5 and STEP 8 for an OFDM block. In the ith iteration, to achieve the peak canceling signal, i shifted kernel signals are scaled respectively and summed up. i×NL multiply operations and (i−1)×NL add operations are required. After M iterations, the total number of the processed kernel signals is $\Sigma_{i=1}^{M}i$. However, the complexity of the method of the present invention is dominated only by the computation load of STEP 6 for an OFDM block. To achieve the final peak canceling signal, M shifted kernel signals are scaled and summed up in STEP 6. M of the method of the present invention and the prior art solution are different for each OFDM block. So, in Table 1 the computation loads of the prior art and present invention solutions are compared in the average number of the processed kernel signals for one peak-cancelled OFDM block.

TABLE 1

The complexity comparison of the two solutions

| Solution | Average number of the processed kernel signals per OFDM block |
|---|---|
| Prior Art | 1.38 |
| Present Invention | 1.17 |

The maximum delays of the prior art and present invention solutions are the processing times after four iterations. The prior solution scaled and summed up 10 kernel signals after four iterations. The new solution scaled and summed up four kernel signals after four iterations. So the maximum delay of the present invention solution is 40% of that of the prior art solution.

The simulation results presented above show that the approach of the present invention performs comparably the prior approach in PAR reduction.

An important advantage of the method of the present invention is that the computation complexity and the maximum delay are reduced greatly. In another words, the computation requirements are reduced to 85% of that of the prior art approach and the maximum processing delay for one OFDM symbol are reduced to 40% of that of the prior art approach.

The method of the present invention was simulated and implemented using MATLAB. Practical implementation of the method of the present invention can be realized in DSP (in software), ASIC (in hardware) or a combination of DSP and ASIC (for example System on Chip).

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

I claim:

1. An active-set PAR reduction method comprises:
   initializing the active set to contain only the location of a maximum magnitude sample of the signal to be PAR reduced;
   finding all samples whose magnitude are above a predetermined magnitude level that is lower than a desired peak level and whose location are not in the active set, and store their locations into a test set;
   calculating the excess values that the magnitudes of the samples whose locations are in the active set overrun the desired peak level;
   using the excess values and the matrix composed by the samples of circularly shifted kernels to resolve a balance vector by which the circularly shifted kernels are weighted to make the magnitudes of the peak cancelled samples at the locations in the active set equal to the desired peak level;
   generating samples of an un-scaled peak canceling signal at the locations in the test set with the balance vector and the samples of the circularly shifted kernels;
   calculating a minimum scalar for each location in the test set, which scales the peak canceling signal and makes the sample of the peak canceled signal at this location have the maximum magnitude of the peak canceled signal at the locations in the active set;
   finding the minimum value between these scalars and one as the balance scalar; and
   moving the location associated with the minimum value from the test set to the active set.

2. The method of claim 1 further comprising, if a maximum iteration number is reached or the balance scalar is equal to one, computing the peak canceling signal by adding up the circularly shifted kernels weighted by the negative product of the balance scalar and vector and output the sum of the peak canceling signal and the original signal.

3. The method of claim 2 further comprising terminating the method once the peak canceling signal is computed.

4. The method of claim 1 further comprising increase an iteration number by one if a maximum iteration number is not reach or the balance scalar is not equal to one.

5. The method of claim 4 further comprising iterating the method at the step of calculating the excess values.

6. The method of claim 1 wherein the initial size of the active set is one.

7. The method of claim 1 wherein an iteration number associated with the method is set to one initially.

* * * * *

UNITED STATES PATENT AND TRADEMARK OFFICE
CERTIFICATE OF CORRECTION

| | | |
|---|---|---|
| PATENT NO. | : 8,170,140 B2 | Page 1 of 1 |
| APPLICATION NO. | : 12/018825 | |
| DATED | : May 1, 2012 | |
| INVENTOR(S) | : Sen Jiang | |

It is certified that error appears in the above-identified patent and that said Letters Patent is hereby corrected as shown below:

Column 8, line 50, "reach" should be --reached--

Signed and Sealed this
Twenty-sixth Day of June, 2012

David J. Kappos
*Director of the United States Patent and Trademark Office*